(12) United States Patent
Enevoldsen

(10) Patent No.: US 12,728,391 B2
(45) Date of Patent: Sep. 8, 2026

(54) SYSTEM FOR REVERSE OSMOSIS AND FOR PRESSURE RETARDED OSMOSIS

(71) Applicant: Danfoss A/S, Nordborg (DK)

(72) Inventor: Georg Herborg Enevoldsen, Nordborg (DK)

(73) Assignee: DANFOSS A/S, Nordborg (DK)

( * ) Notice: Subject to any disclaimer, the term of this patent is extended or adjusted under 35 U.S.C. 154(b) by 493 days.

(21) Appl. No.: 18/330,401

(22) Filed: Jun. 7, 2023

(65) Prior Publication Data

US 2023/0398493 A1 Dec. 14, 2023

(30) Foreign Application Priority Data

Jun. 8, 2022 (EP) .................................... 22177934

(51) Int. Cl.
*B01D 61/58* (2006.01)
*B01D 61/00* (2006.01)
(Continued)

(52) U.S. Cl.
CPC ......... *B01D 61/58* (2013.01); *B01D 61/0022* (2022.08); *B01D 61/0023* (2022.08);
(Continued)

(58) Field of Classification Search
None
See application file for complete search history.

(56) References Cited

U.S. PATENT DOCUMENTS 3,707,231 A * 12/1972 Bradley ............... B01D 61/002 210/321.66
6,468,461 B1 10/2002 Sumiyoshi et al.
(Continued)

FOREIGN PATENT DOCUMENTS

CN 105142762 A 12/2015
CN 111186949 A 5/2020
(Continued)

OTHER PUBLICATIONS

Childress, Amy E., "Osmotically Assisted Desalination: A Low Energy Reverse Osmosis Hybrid Desalination System", Desalination and Water Purification Research and Development Program Report No. 164 Task VII: Pilot-Scale Projects, May 2017.
(Continued)

*Primary Examiner* — Krishnan S Menon
(74) *Attorney, Agent, or Firm* — McCormick, Paulding & Huber PLLC

(57) ABSTRACT

A system for reverse osmosis, RO, and for pressure retarded osmosis, PRO, includes: a RO subsystem (10) with a high-pressure RO chamber (11) and a low-pressure RO chamber (12) separated by a RO membrane (13), the high-pressure RO chamber (11) having a RO feed inlet (14) and a brine outlet (15) and the low-pressure RO chamber (12) having a permeate outlet (16); a PRO subsystem (20) with a high-pressure PRO chamber (21) and a low-pressure PRO chamber (22) separated by a PRO membrane (23), the high-pressure PRO chamber (21) having a draw inlet (24) and a draw outlet (25) and the low-pressure PRO chamber (22) having PRO feed inlet (26) and a PRO feed outlet (27); an induction motor (30) having a stator and a rotor, wherein the rotor is mechanically connected to an input shaft of a hydraulic pump (31) configured for providing a feed solution to the RO feed inlet (14) and to an output shaft of a hydraulic motor (32) configured for receiving a draw solution from the draw outlet (25). The invention further discloses a method for operating such system for RO/PRO and to the use of such system.

19 Claims, 6 Drawing Sheets

(51) Int. Cl.

| | |
|---|---|
| ***B01D 61/06*** | (2006.01) |
| ***B01D 61/08*** | (2006.01) |
| ***B01D 61/10*** | (2006.01) |
| ***C02F 1/44*** | (2023.01) |
| ***C02F 103/08*** | (2006.01) |

(52) U.S. Cl.

CPC ........... *B01D 61/005* (2013.01); *B01D 61/06* (2013.01); *B01D 61/08* (2013.01); *B01D 61/10* (2013.01); *C02F 1/441* (2013.01); *C02F 1/445* (2013.01); *B01D 2313/243* (2013.01); *B01D 2313/246* (2013.01); *B01D 2313/50* (2013.01); *B01D 2317/022* (2013.01); *B01D 2317/08* (2013.01); *C02F 2103/08* (2013.01); *C02F 2201/009* (2013.01); *C02F 2303/10* (2013.01)

(56) References Cited

U.S. PATENT DOCUMENTS

| | | | |
|---|---|---|---|
| 10,308,524 | B1 | 6/2019 | Ahmed et al. |
| 2009/0071902 | A1 | 3/2009 | Stover et al. |
| 2015/0352497 | A1 | 12/2015 | Sakai et al. |
| 2017/0066670 | A1 | 3/2017 | El-Sayed |
| 2019/0070560 | A1 | 3/2019 | Kennedy et al. |

FOREIGN PATENT DOCUMENTS

| | | | |
|---|---|---|---|
| DE | 10 2010 014 464 | A1 | 10/2011 |
| FR | 3 100807 | A1 | 3/2021 |
| WO | 2013/172605 | A1 | 11/2013 |

OTHER PUBLICATIONS

He, Wei, et al., "Thermodynamic analysis of a stand-alone reverse osmosis desalination system powered by pressure retarded osmosis", Desalination 352 (2014) 27-37, http://dx.doi.org/10.1016/j.desal.2014.08.006.

Jeng, Jyh-Cheng, et al., "Design, Operation, and Control of Stand-Alone Hybrid Membrane Osmosis Desalination Systems", Chemical Engineering Transactions. vol. 86, 2021.

Altaee et al., Integration and optimization of pressure retarded osmosis with reverse osmosis for power generation and high efficiency desalination, Energy vol. 103 (2016), p. 110-118.

* cited by examiner

SYSTEM FOR REVERSE OSMOSIS AND FOR PRESSURE RETARDED OSMOSIS

CROSS-REFERENCE TO RELATED APPLICATION

This application claims foreign priority benefits under 35 U.S.C. § 119 from European Patent Application No. 22177934.1, filed Jun. 8, 2022, the content of which is hereby incorporated by reference in its entirety.

TECHNICAL FIELD

The invention relates to a system for reverse osmosis and for pressure retarded osmosis, particularly to system for the combined operation of both processes. The invention further relates to a method for the operation of such system, exemplarily a standalone operation, and to the use of such system for producing fresh water next to salt and/or other minerals.

BACKGROUND

Osmosis is a process wherein solvent moves across a semipermeable membrane from the membrane's side facing a lower solute concentration towards the membrane's side facing a higher solute concentration. Therein, the movement of the solvent particles is driven by diffusion and, overall, more solvent particles diffuse towards the higher solute concentration, i.e., the lower water potential, resulting in a net movement of the solvent. This naturally occurring process is underlying both, reverse osmosis as well as pressure retarded osmosis.

In reverse osmosis, a pressure exceeding the osmotic pressure is applied to the side of the higher solute concentration thus reverting the energy balance of the osmotic system causing an overall net diffusion movement from the high solute to the low solute concentration across the membrane, thus increasing solvent concentration at the pressurized membrane side. Reverse osmosis systems comprise at least two chambers that are separated by a semipermeable membrane, wherein inflow and outflow of said chambers can be controlled for setting volumetric flow conditions as well as the pressure gradient across the membrane.

Reverse osmosis, RO, is frequently applied for water purification or desalination applications where it yields a highly concentrated brine next to the purified and/or desalinated water. The brine remains at the pressurized side of the membrane, whereas the purified and/or desalinated water (permeate) is removed from the other membrane side at a low pressure. The pressurized brine is removed from the reverse osmosis chamber in order to avoid an excessive increase in osmotic pressure and to allow for inflow of the fresh feed solution into the chamber. It is known to use energy recovery devices, for example the Danfoss iSave device, for the purpose of transferring hydraulic energy from the pressured brine to the feed solution in order to improve the overall energy efficiency of the reverse osmosis process.

Pressure retarded osmosis, PRO, is based on forward osmosis with a net flow towards the higher solute concentration but external pressure is again applied against the osmotic pressure gradient. In a PRO process, energy can be produced based on concentration, e.g., salinity, gradients between a feed and a draw solution and the upper limit of the retrievable energy is defined by the Gibbs free energy related to mixing these solutions. In practice, the concentrated draw solution, e.g., seawater, and the feed solution, e.g., brackish or fresh water (such as for example river water), are separated by a semipermeable membrane and water will diffuse from the feed side into the pressurized draw solution side. To recover the generated hydraulic energy, the resulting pressurized and diluted draw solution can be supplied to a hydro-turbine to generate electric power.

It is apparent that the RO process and the PRO process are suitable to be combined, as the RO process yields a concentrated brine solution while the PRO process draws energy from concentration gradients. Various studies have thus already analyzed the thermodynamic potential of a combination of these processes. Therein, the combination of PRO and RO has been found to allow e.g., for reducing the costs of the RO process, e.g., for seawater desalination, and for diluting the RO brine solution for lowering its environmental impact. Also, a prototype RO-PRO hybrid plant has been developed in the Japanese national development project "Mega-ton Water System" which used a RO brine in a PRO process.

However, the known studies on RO-PRO hybrid systems focus rather on thermodynamic models for improving the energy efficiency of the combined process than on practical ways of implementing such a hybrid system. Exemplarily, while use and impact of so-called energy recovery devices, ERD, are often considered in previous publications (see e.g., Altaee et al., *Integration and optimization of pressure retarded osmosis with reverse osmosis for power generation and high efficiency desalination*, Energy 103 (2016), p. 110-118), details regarding the construction and operation of such ERD devices are often disregarded therein.

It is thus an object of the present disclosure to overcome or at least reduce the drawbacks of the prior art and to provide a system for combined reverse osmosis and pressure retarded osmosis with an improved efficiency that also allows for versatile operation conditions.

SUMMARY

The objective of the disclosure is solved and the disadvantages of the prior art are overcome or at least reduced by the subject-matter of the present invention, i.e., by system for reverse osmosis, RO, and for pressure retarded osmosis, PRO, according to the appended claims as well as by a system for operating such a system for RO and for PRO according to the claims.

An aspect of the present disclosure relates to a system for reverse osmosis, RO, and for pressure retarded osmosis, PRO, comprising a RO subsystem and a PRO subsystem.

Therein, the RO subsystem comprises a high-pressure RO chamber and a low-pressure RO chamber that are separated by a RO membrane. The chambers preferably form a RO tank that is configured to house the RO process and to withstand the occurring pressures. The high-pressure RO chamber has a RO feed inlet and a brine outlet and is configured to receive a RO feed solution via the RO feed inlet. The low-pressure RO chamber has a permeate outlet and is configured to receive a permeate, i.e., the draw solution with reduced solute concentration, via the RO membrane. The permeate is removed from the low-pressure RO chamber via the permeate outlet at a first RO pressure, while the up-concentrated draw solution (brine) is removed from the high-pressure RO chamber via the brine outlet at a second RO pressure. Therein, the first RO pressure is lower than the second RO pressure.

The RO membrane is configured for allowing the diffusion of the solvent of the feed solution under an external pressure applied to the high-pressure RO chamber. In a preferred embodiment the feed solution is salt water, e.g., sea water, and the RO membrane is configured to allow water to diffuse through the membrane while not letting salt ions, such as $Na^+$ and $Cl^-$, pass through the membrane. Preferably, the RO membrane is further configured to not let organics, bacteria, and pyrogens pass through the membrane. The RO membrane preferably is one of a cellulose acetate, CA, membrane, or a polysulfone membrane which may further be coated with aromatic polyamids. Also preferred, the RO membrane is a nano-structured RO membrane, a zeolithe membrane, and/or a spiral wound RO membrane.

The PRO subsystem comprises a high-pressure PRO chamber and a low-pressure PRO chamber that are separated by a PRO membrane. The chambers preferably form a PRO tank that is configured to house the PRO process and to withstand the occurring pressures. The low-pressure PRO chamber has a PRO feed inlet and a PRO feed outlet and is configured to receive a PRO feed solution via the PRO feed inlet and to provide (output) the PRO feed solution via the PRO feed outlet. Therein, the PRO feed solution outputted via the PRO feed outlet is preferably up-concentrated compared to the PRO feed solution received via the PRO feed inlet. The PRO feed solution is received at the PRO feed inlet at a first PRO pressure, while the PRO feed solution is output at the PRO feed outlet at a second PRO pressure that is lower than the first PRO pressure.

The high-pressure PRO chamber has a draw inlet configured to receive a draw solution and is further configured to receive a solvent of the PRO feed solution via the PRO membrane. The high-pressure PRO chamber further has a draw outlet that is configured to provide (output) a diluted draw solution. The draw solution has a higher solute concentration as the PRO feed solution. Exemplarily, the draw solution is a brine and the PRO feed solution is fresh water. However, the draw solution could also be a solution of another (mineral) solute, wherein the PRO feed solution comprises a lower concentration of said (mineral) solute. Preferably, the draw solution is a brine or mineral solution output by the high-pressure RO chamber. The draw solution is received at a third PRO pressure and volumetric flow, while the diluted draw solution is output at a fourth PRO pressure and volumetric flow, wherein the fourth pressure is at least the same as the third PRO pressure, while a volumetric flow of the diluted draw solution is increased over the volumetric flow of the draw solution.

The PRO membrane is configured for allowing the diffusion of the solvent of the PRO feed solution against a pressure applied to the high-pressure PRO chamber. In a preferred embodiment the PRO feed solution is salt water, e.g., sea water, or fresh water and the PRO membrane is configured to allow water to diffuse through the membrane while not letting salt ions, such as $Na^+$ and $Cl^-$, pass through the membrane. Preferably, the PRO membrane is further configured to not let organics, bacteria, and pyrogens pass through the membrane. The PRO membrane preferably is one of a cellulose acetate, CA, membrane, a thin film composite membrane (TFC) (e.g., comprising joined sheets of polysulfone, PSF, and polyamide, or of polyacrylonitrile (PAN) and poylamid), and a hollow fiber PRO membrane (e.g., from polyethersulfone, PES, polyetherimide, or the like).

In the system of the present disclosure, a hydraulic pump that is configured for providing the feed solution to the RO feed inlet is mechanically connected to a hydraulic motor that is configured for receiving the draw solution from the draw outlet of the PRO chamber. In other words, the hydraulic pump driving the RO subsystem is mechanically connected to the hydraulic motor generating power in the PRO subsystem. Hence, in the system for RO and PRO according to the present disclosure, the RO subsystem and the PRO subsystem are mechanically connected. This allows for advantageous modes of operation as described in more detail below. In short, this configuration allows for a direct transfer of energy from the PRO subsystem to the RO subsystem without conversion losses, particularly without any losses due to conversion of mechanical energy to electrical energy in the PRO side and without losses due to conversion of electrical energy to mechanical energy in the RO side.

The mechanical connection of the hydraulic motor and the hydraulic pump preferably is a direct mechanical connection, for example via a common drive shaft of the hydraulic motor and the hydraulic pump, via a pinion, a drive belt, and/or a propeller shaft. Therein, a part of the common drive shaft may function as an output shaft of the hydraulic motor and another part of the common drive shaft may function as an input shaft of the hydraulic pump. In such a scenario, energy may be transferred between the RO subsystem and the PRO subsystem via the direct mechanical connection, e.g., in the form of torque and/or rotation speed. In more detail, hydraulic energy (volumetric flow, pressure) in the PRO subsystem is converted into mechanical energy (torque, rotational speed) by the hydraulic motor and transferred via the direct mechanical connection into the RO subsystem, where it is again back converted to hydraulic energy (volumetric flow, pressure) via the hydraulic pump.

In such embodiment, the hydraulic energy utilized in the PRO subsystem and/or the hydraulic energy consumed in the RO subsystem may be adapted in order to match each other, thus allowing for a faultless direct mechanical connection. Exemplarily, a pressure drop at the hydraulic motor may be adjusted (e.g., lowered) in order to adapt (e.g., reduce) the hydraulic energy that is converted there into mechanical energy. In the same manner, a pressure rise at the hydraulic pump may be adjusted (e.g., increased) in order to match a mechanical energy provided via the common shaft. Such adaptions may be carried out using adjustable valves.

Further preferred, the mechanical connection is an indirect mechanical connection, for example via a gear box, a transmission, and/or a clutch. In such embodiment, preferably an output shaft of the hydraulic motor is mechanically connected to an input shaft of the hydraulic pump via the gearbox, transmission, and/or a clutch. An indirect mechanical connection advantageously allows for matching the power output of the PRO subsystem and the power intake of the RO subsystem more efficiently and without the necessity to control the flow processes in said subsystems. Exemplarily, via a gear box a rotation speed and/or torque provided via the output shaft of the hydraulic motor may be adapted to a rotation speed and/or torque required by the input shaft of the hydraulic pump. At the same time, the hydraulic processes in the RO subsystem and the PRO subsystem may remain the same. In such a manner, an indirect mechanical connection allows for a faultless operation of the system, e.g., by avoiding overload of mechanical components, as well as for power distribution.

In a preferred embodiment, the system of the present disclosure further comprises an induction motor, particularly an asynchronous AC electric motor, with a stator and a rotor. Preferably, the induction motor is a three-phase squirrel-cage motor that is configured to operate at a substantially constant (rotational) speed assuming a given AC input frequency and winding configuration (pole adjustment). Particularly preferred, the induction motor is a doubly-fed electric machine (DFIM), such as a double-fed induction generator (DFIG) or Doubly-fed wound rotor asynchronous machine (DASM) that is configured to operate at a variable (rotational) speed assuming a given winding configuration (pole adjustment). In a DFIM, DFIG, or DASM, the stator is preferably connected directly with an AC power source such as a power storage device or a power grid, while the rotor is connected thereto via a frequency converter. In other words, the induction motor is configured either as a fixed speed generator (FSG) or an adjustable speed generator (ASG), wherein the latter can be configured as a direct-in-line ASG system or a DFIG ASG system, preferably comprising an IGBT converter.

The skilled person is aware of multiple designs for such an induction motor which are commonly used in various industrial applications, such as e.g., wind turbines. Exemplary designs, schematics and circuit diagrams are e.g., discloses in S. MULLER; S.; et al. (2002). "Doubly Fed Induction Generator Systems for Wind Turbines" (PDF). IEEE Industry Applications Magazine. IEEE. 8 (3): 26-33. doi:10.1109/2943.999610, as well as in Roberts, Paul C. (2004). "Study of Brushless Doubly-Fed (Induction) Machines; Contributions in Machine Analysis, Design and Control" (PDF). Emmanuel College, University of Cambridge. The whole content of the aforementioned documents is incorporated herein by reference.

According to this preferred embodiment, the rotor of the induction motor is mechanically connected to (an input shaft of) the hydraulic pump that is configured for providing the feed solution to the RO feed inlet. The rotor of the induction motor is also mechanically connected to (an output shaft of) the hydraulic motor that is configured for receiving the draw solution from the draw outlet of the PRO chamber. In other words, the rotor of the induction motor is mechanically connected to the hydraulic pump driving the RO subsystem as well as to the hydraulic motor generating power in the PRO subsystem. In other words, also in this embodiment, an indirect mechanical connection exists between the RO subsystem and the PRO subsystem. In the context of this application, an input/output shaft refers to any mechanical component (e.g., pinion) that is configured to convey mechanical energy that is input/output by a given device. The mechanical connection of the rotor to the hydraulic motor and/or the hydraulic pump is either a direct mechanical connection (e.g., via a common shaft of the induction motor) or an indirect mechanical connection (e.g., via a gearbox). Particularly preferred, the induction motor is a dual-shaft induction motor or double shaft induction motor, wherein the rotor is connected to two shafts, one of which is then preferably connected to the hydraulic motor and the other one to the hydraulic pump.

In the system for RO and PRO according to this preferred embodiment, the RO subsystem and the PRO subsystem, namely a hydraulic pump in the RO subsystem that is configured for providing a feed solution to the RO feed inlet and a hydraulic motor in the PRO subsystem that is configured for receiving a draw solution from the draw outlet, are mechanically connected via the rotor of the induction motor. This again allows for a direct transfer of energy from the PRO subsystem to the RO subsystem without conversion losses, particularly without losses due to electric power conversion in power converters, such as e.g., AC/DC, AC/AC or DC/DC converters or variable frequency drives.

Further, the combination of hydraulic motor, induction motor and hydraulic pump can be operated (configured to be operated) with a net positive power production, wherein the produced power can be advantageously distributed and/or used to operate other electrical consumers in the system, e.g. feed pumps, etc. Further, the system's configuration allows for a simple compensation of energetic differences between the PRO and the RO subsystem by adding or retrieving electric power to or from the system. Preferably, the induction motor can be operated with a variable slip, wherein a positive slip corresponds to an operation mode in which energy is consumed by the induction motor and wherein a negative slip corresponds to an operation mode in which electric energy is generated by the induction motor, i.e., in which the induction motor functions as generator.

In an also preferred embodiment, the system of the present disclosure further comprises a feed solution reservoir that is connected to the RO feed inlet via the hydraulic pump. Additionally or alternatively, the feed solution reservoir is further connected to the draw outlet via the hydraulic motor. Exemplarily, the feed solution reservoir is a seawater reservoir providing the RO feed solution to the RO subsystem and receiving the diluted PRO draw solution, preferably the diluted RO brine, from the PRO draw outlet. Further preferred, the feed solution reservoir is also connected to the PRO feed inlet. In such a configuration, the brine output of the RO subsystem is preferably connected to the draw inlet and hence a concentration gradient for operating the PRO subsystem is advantageously ensured. Such a setup having solely a single feed solution reservoir is advantageously a simple configuration.

In a further preferred embodiment, the system further comprises a draw solution reservoir that is different from the feed solution reservoir and that is connected to the brine outlet, the draw inlet, the draw outlet and, eventually, the PRO feed outlet. Such a draw solution reservoir preferably allows to collect the higher concentrated solutions separate from the feed solution reservoir. This has not a positive ecological impact and allows for further advantageous operation modes of the system, e.g., for up-concentrating and harvesting minerals. The draw solution reservoir may be configured as a tank, e.g. closed tank, or as an open reservoir, such as e.g., an artificial lake. The draw solution reservoir further preferably comprises a concentrate outlet for providing the up-concentrated solutions to subsequent processes, such as e.g., an evaporator, another PRO stage or the like. Further details of operation modes of a system having such a draw solution reservoir are described below.

In the system of the present disclosure, the hydraulic pump preferably is an axial piston pump. Such axial piston pump comprises a mechanical shaft (input shaft) that is connected to a swash plate carrying a plurality of pistons arranged inside a cylinder block. The pistons may be axially oriented (i.e., parallel to the shaft axis). A cam angle between a normal vector of the swash plate and the shaft axis determines a displacement of the pump and effects protruding and reciprocating movement of the pistons based on a relative rotation of the swash plate and the cylinder block. This movement of the pistons is used to displace (pump) fluid from a pump inlet to a pump outlet, which may both be disposed in a port and valve plate. The use of an axial piston pump in the system advantageously allows for positive displacement pumping with a minimum of moving parts and seals as well as with oil-free lubrication. Exemplarily, the hydraulic pump used in the system of this disclosure is a Danfoss APP high pressure pump.

Further preferred, (additionally or alternatively) the hydraulic motor is an axial piston motor. Also the axial piston motor comprises a mechanical shaft (output shaft)

that is connected to a swash plate carrying a plurality of pistons arranged inside a cylinder block. Again, the pistons may be axially oriented (i.e., parallel to the shaft axis). A cam angle between a normal vector of the swash plate and the shaft axis determines a displacement of the motor. Applying pressurized fluid to the pistons via a motor inlet (generator inlet) effect protruding and reciprocating movement of the pistons and a relative rotation of the swash plate and the cylinder block. The output (rotational) speed of the axial piston motor is proportional to the input flow and its drive torque is proportional to the difference in pressure between the motor inlet and outlet. The use of an axial piston motor in the system advantageously allows for generating rotational energy from pressurized fluid with a minimum of moving parts and seals as well as with oil-free lubrication. Another important advantage is that the axial piston pump/motor allows a wide operational window in both pressures and flows and still maintaining relative high energy efficiencies. Exemplarily, the hydraulic pump is one of a Danfoss high-pressure PAH pump, a Danfoss MP1 axial piston motor, and an H1 bent axis variable motor. The use of axial piston motor and axial piston pump further allows for a system with high symmetry (and thus easy maintenance) and low vibrations.

In a preferred embodiment, at least one of the hydraulic pump and the hydraulic motor has an adjustable displacement. Particularly preferred, the hydraulic pump is an adjustable displacement axial piston pump and/or the hydraulic motor is an adjustable displacement axial piston motor. In other words, preferably one of the axial piston pump and the axial piston motor has an adjustable stroke capacity. By utilizing a variable displacement pump and a variable displacement motor connected to the same induction motor, advantageously the operation conditions of the system can be finely controlled. Exemplarily, a displacement of the axial piston motor can be set to a minimum (almost zero cam/swash plate angle) during a startup of the system, while a displacement of the axial piston pump can be set to an allowable maximum (increased cam/swash plate angle). Once the system is operating, i.e., the fluid output from the brine outlet is provided to the draft input, the displacement (cam/swash plate angle) of the axial piston pump can be reduced, while the displacement (cam/swash plate angle) of the axial piston motor is increased to an allowable maximum.

Further preferred, the axial piston pump and/or the hydraulic piston motor may have a direct displacement control, either mechanically, electro-mechanically or hydro-mechanically. Therein, the control circuits of the axial piston pump and/or the hydraulic piston are preferably connected, e.g., for allowing for a combined control of pump and motor. Also preferred, the axial piston pump and/or the hydraulic piston motor may each be pressure-compensated. Therein, the pressure compensation might be configured to adjust an output flow of the pump to maintain a predefined pressure at the pump outlet and/or to adjust an input flow of the motor to maintain a predefined pressure at the motor inlet. Further preferred, the pressure compensation is configured to control an input flow of the motor to maintain a predefined pressure at the pump outlet and/or to adjust an output flow of the pump to maintain a predefined pressure at the motor inlet. Such configuration advantageously prevents overpressure at the pump (RO) side, which might be caused by increased inflow to the motor (PRO) side, wherein such pressure compensation may even be used with a fixed connection of pump input shaft and motor output shaft to the rotor of the induction motor.

According to a preferred embodiment, the induction motor is connected to a power grid and/or an energy storage device. Therein, a connection to an energy storage device advantageously allows for a standalone operation of the system, wherein the energy storage device serves to compensate differences of hydraulic energy between the PRO and the RO subsystem by adding or retrieving electric power to or from the system. The energy storage device preferably is a battery, e.g., a lithium ion battery, but may also be another form of energy storage device, such as a hydroelectric storage or the like. Connecting the induction motor to a power grid further increases the versatility of the system and also allows for operating the system in cold-start conditions by using energy from the power grid. The induction motor may be connected directly to the power grid or to an AC output of the energy storage device. The synchronous rotation speed of the induction motor is preferably defined by the AC frequency and can be adjusted by using a gear box or a pole-adjustable winding. The induction motor may also be connected to the power grid or the energy storage device via a power converter, preferably via an (IGBT based) frequency converter, or the like.

In a particularly preferred embodiment of the disclosed system, a displacement of the hydraulic pump is lower than a displacement of the hydraulic motor. In other words, a stroke capacity of the axial piston pump is lower than a stroke capacity of the axial piston motor. Therein, the displacement of the hydraulic pump may be set or built to be lower than the displacement of the hydraulic motor. In such a configuration, a pressure and/or volumetric flow rate at the hydraulic motor inlet in the PRO subsystem exceeds a pressure and/or volumetric flow rate at the outlet of the hydraulic pump in the RO subsystem, i.e., the hydraulic energy at the motor exceeds the hydraulic energy at the pump. As the motor and the pump are both connected to the rotor of the induction motor, the latter will thus operate with a negative slip, i.e., the motor is running above the synchronous speed of the stator, and hence supplies electric power to the energy storage device and/or the power grid.

In a further preferred embodiment, at least one of the hydraulic pump and the hydraulic motor is configured to be operated with variable delta pressures ($\Delta p$). Therein, such delta pressure refers to a pressure difference between a pump/motor inlet and a pump/motor outlet. Particularly preferred, a pressure drop at the hydraulic motor may be adjusted and/or a pressure rise at the hydraulic pump may be adjusted. Such adjustments may be carried out via inlet or outlet valves of said pump and/or motor. Preferably, the hydraulic motor is configured to operate between (with) higher delta pressures than the hydraulic pump. In other words, the pressure differences occurring at the hydraulic motor exceed the pressure differences at the hydraulic pump. Exemplarily, the hydraulic motor in the PRO subsystem receives a working fluid with a pressure of about 200 bar and outputs the working fluid with a reduced pressure of about 2 bar, while the hydraulic pump in the RO subsystem receives a respective working fluid with a pressure of about 2 bar and outputs it with a pressure of about 60 bar. In such a setup, the displacement of the hydraulic pump can be larger than that of the hydraulic motor (e.g., up to 3 times), while a net positive energy production is still enabled.

In other words, by setting the fluid throughput and/or the delta pressures of the hydraulic motor to exceed the fluid throughput and/or the delta pressures of the hydraulic pump, either by default or by setting a variable displacement and/or by adjusting valves of the hydraulic motor and/or the hydraulic pump, the system of the present disclosure advantageously allows for a combined RO-PRO operation and the generation of surplus electrical energy with a simple, compact and robust setup. The surplus energy generated in the system can be either supplied to the energy storage device and/or the power grid and may also be utilized in the system of this disclosure itself. Exemplarily, the system preferably further comprises at least one feed pump in the RO subsystem and/or in the PRO subsystem. The at least one feed pump is preferably supplied by the surplus energy created in the induction motor, either directly or via the power grid and/or the energy storage device.

In a preferred embodiment, the system of the present disclosure further comprises at least one energy recovery device, ERD, that is configured to transfer hydraulic energy from an input flow to an output flow. Exemplarily, such an ERD is interconnected between the brine outlet and the RO feed inlet. Additionally or alternatively, such an ERD is interconnected between the draw outlet and the draw inlet. Further preferred, such an ERD is interconnected between the PRO subsystem and the RO subsystem. Particularly preferred, the ERD is the Danfoss iSave device. However, other ERDs can be utilized in the disclosed system as well. The use of such ERD advantageously further improves the energy efficiency of the system as whole.

Another aspect of the present disclosure relates to a method for operating a system for reverse osmosis, RO, and for pressure retarded osmosis, PRO, according to the present disclosure as described above. Therein, the method of the present disclosure comprises at least the step of providing a feed solution to the RO feed inlet at a first pressure and a first volumetric flow rate via the hydraulic pump, the step of receiving, by the hydraulic motor, a draw solution from the draw outlet at a second pressure and a second volumetric flow rate, and a step of transferring energy from the hydraulic pump configured for providing a feed solution to the RO feed inlet to the hydraulic motor configured for receiving a draw solution from the draw outlet via a mechanical connection. Hence, the method of the present disclosure advantageously allows for energy transfer between a RO and PRO subsystem without electric conversion losses. Details of the mechanical connection (direct or indirect) and the related operation modes have been already discussed above and a repeated description is omitted for the sake of brevity.

Preferably, the method further comprises the steps of operating the system in a first operation mode with a net energy consumption and operating the system in a second operation mode with a net energy production. Therein, in the first operation mode energy transferred from the PRO subsystem to the RO subsystem is not fully sufficient for operating the system as a whole, while in the second operation mode the transferred energy is sufficient. Further, in the second operation mode the energy transfer may be adjusted by manipulating flow and/or pressure conditions in the RO and/or PRO subsystem (e.g., via adjustable valves), by manipulating an indirect mechanical connection (e.g., a gearbox), or by manipulating an induction motor.

In a further preferred embodiment, the system of the present disclosure comprises an induction motor having a stator and a rotor as described above, wherein the rotor is mechanically connected to (an input shaft of) the hydraulic pump and to (an output shaft of) the hydraulic motor. In this embodiment, the method further comprises the step of operating the induction motor with a slip based on a ratio of the first pressure and first volumetric flow rate to the second pressure and second volumetric flow rate. In other words, in the method of the present disclosure, the ratio of the hydraulic energy in the RO subsystem and the PRO subsystem is advantageously connected to the slip of the induction motor that mechanically connects the RO subsystem and the PRO subsystem. Hence, the method of this preferred embodiment advantageously allows for simple control via the slip of the induction motor.

In a preferred embodiment of the method of the present disclosure, the induction motor is connected to an energy storage device being a part of the system for RO and for PRO and/or to a power grid (electric power grid). According to this embodiment, the method further comprises the steps of operating the system in the first operation mode, wherein the induction motor operates with a positive slip and consumes electrical energy from the energy storage device and/or the power grid. In other words, in the first operation mode the hydraulic energy required by the RO subsystem exceeds the hydraulic energy provided by the PRO subsystem and the difference of hydraulic energy is compensated via the induction motor. The method further comprises the step of operating the system in the second operation mode, wherein the induction motor operates with a negative slip and supplies electrical energy to the energy storage device and/or to the power grid. In other words, in the second operation mode the hydraulic energy provided by the PRO subsystem exceeds the hydraulic energy required by the RO subsystem and the surplus is converted by the induction motor.

The above-described first and second operation modes can be implemented in the disclosed system by design, for example by using a hydraulic pump with a stroke capacity that is (significantly) smaller than the stroke capacity of the hydraulic motor, hence allowing for an energy surplus conversion via the induction motor, the rotor of which is connected to the shafts of both, motor and pump. In another example, the hydraulic motor is configured to operate between (with) higher delta pressures than the hydraulic pump and/or other components of the PRO and/or RO subsystem (e.g., valves) may be adjusted for setting desired delta pressures.

However, in a further preferred embodiment at least one of the hydraulic pump and the hydraulic motor of the disclosed system has an adjustable displacement and/or adjustable delta pressures. In such preferred embodiment, the method further comprises the steps of adjusting, in the first operation mode, a displacement ratio of the hydraulic pump and the hydraulic motor to be larger than 1. Such displacement ratio preferably correlates with a pressure at the motor inlet of the PRO subsystem that exceeds a pressure at the pump outlet in the RO subsystem. Alternatively or additionally, the method further comprises the steps of adjusting, in the first operation mode, the delta pressures of the hydraulic motor to be smaller than the delta pressures of the hydraulic pump, e.g., by using adjustable valves or the like.

In the second operation mode, the displacement ratio of the hydraulic pump and the hydraulic motor is preferably adjusted to be smaller than 1. This displacement ratio preferably correlates with a pressure at the PRO motor inlet that is smaller than that at the RO pump outlet. Alternatively or additionally, the method further comprises the steps of adjusting, in the second operation mode, the delta pressures of the hydraulic motor to be larger than the delta pressures of the hydraulic pump, e.g., by using adjustable valves or the like.

According to this preferred embodiment of the disclosed method, the first operation mode can be dynamically changed to the second operation mode and back by adjusting the displacement and/or delta pressures of the hydraulic pump and/or the hydraulic motor. This embodiment advantageously provides the system with the capability of freely setting the operation mode, which advantageously allows for setting optimal operation conditions, e.g., during a start-up, or when the flow and/or pressures in the PRO subsystem vary, or if a RO water production needs to be increased.

In a further preferred embodiment, the system of the present disclosure comprises at least one feed pump located in the RO subsystem and/or in the PRO subsystem and the method of the present disclosure further comprises the step of operating the at least one feed pump with electrical energy from the energy storage device. Such an electrical feed pump is preferably operated in addition to the hydraulic pump and at least during part of the operation time of the system. Exemplarily, during start-up of the system the PRO subsystem may not generate sufficient energy for powering the system (e.g., due to a lack of RO brine as draft solution) while the RO subsystem needs energy input to operate. In such a situation, the induction motor may operate with positive slip and drive the hydraulic pump. Further, in such situation at least one feed pump in the RO subsystem and, eventually, in the PRO subsystem may be driven with energy from the energy storage device. Operating at least one feed pump allows using a combination of hydraulic pump, induction motor and hydraulic motor that is optimized for and particularly efficient in a steady operation of the system. However, the at least one feed pump may also be operated during a steady operation of the system to maintain flow over longer distances and for reducing the load on the hydraulic pump. Therein, the at least one feed pump may be powered from the energy storage device, via the power grid or directly from the induction motor via a suitable control and connection.

In a further preferred embodiment, the system of the present disclosure further comprises a seawater reservoir that is connected to the RO feed inlet via the hydraulic pump and that is further connected to the PRO feed inlet. The system further comprises a draw solution reservoir that is connected to the draw outlet via the hydraulic motor and that is further connected to the draw inlet and to the brine outlet. In such scenario, the system may not only be used for providing desalinated water as a RO permeate while providing electrical power using the PRO process and the RO up-concentrated feed solution (brine). The system may further be used for harvesting minerals, such as salt, etc. In such a preferred embodiment, the method of the present disclosure further comprises the steps of collecting brine from the brine outlet in the draw solution reservoir and of providing, from the draw solution reservoir, draw solution to the PRO draw inlet and receiving, in the draw solution reservoir, diluted draw solution from the PRO draw outlet. In other words, the draft solution reservoir functions as a buffer between the RO process and the PRO process and further receives the diluted PRO draft solution generated in the PRO process. Hence, a net inflow to the draft reservoir is determined by the volumetric flow at the brine outlet and by the volumetric flow across the PRO membrane, wherein the latter corresponds to the difference of the volumetric flow rate at the PRO draw outlet and the volumetric flow rate at the PRO draw inlet.

A brine concentration corresponds to a baseline concentration of the draft solution reservoir, while the volumetric flow across the PRO membrane has a lower concentration (almost zero) of a solute than the draft solution reservoir and leads to dilution of the draft solution reservoir. The method of this embodiment further comprises the step of evaporating solvent from the draw solution reservoir with an evaporation rate of the solvent that exceeds a difference of the volumetric flow rate at the PRO draw outlet and the volumetric flow rate at the PRO draw inlet, i.e., which exceeds a volumetric flow across the PRO membrane. By controlling inflow to the draft solution reservoir and maintaining such evaporation rate, a solute concentration of the draft solution reservoir will continuously rise, making the draft solution reservoir usable for mineral (salt) harvesting, either directly or by withdrawing the up-concentrated draft solution. In a scenario with more inflows and/or outflows into the draft solution reservoir, the evaporation rate must be set at least high enough to maintain a constant concentration in the draft solution reservoir. The evaporation rate can be adjusted for example by setting the size, particularly the surface size, of the draft solution reservoir being in thermal equilibrium with its surrounding. Additionally and/or alternatively additional heat sources could be used. The up-concentrated draft solution may also be removed from the draw solution reservoir and provided to another subsequent PRO process for generating electrical energy.

Another aspect of the present disclosure relates to a use of a system for reverse osmosis, RO, and for pressure retarded osmosis, PRO, according to the present disclosure as described above, the system comprising a seawater reservoir that is connected to the RO feed inlet via the hydraulic pump and to the PRO feed inlet, the system further comprising a draw solution reservoir that is connected to the PRO draw outlet via the hydraulic motor and is further connected to the brine outlet. According to this aspect of the disclosure, said system is used for concentrating salt and/or other minerals in the draw solution reservoir, for extracting the salt and/or other minerals from the draw solution reservoir, and for providing freshwater from the permeate outlet. For realizing such usage of the system, the system may be operated according to the method of the present disclosure as described above. Also preferred, the system is further used to create electrical energy via the induction motor.

Further aspects and preferred embodiments of the invention result from the dependent claims, the drawings and the following description of the drawings. Different disclosed embodiments are advantageously combined with each other if not explicitly stated otherwise.

BRIEF DESCRIPTION OF THE DRAWINGS

The features of the invention become apparent to those skilled in the art by the detailed description of exemplary embodiments with reference to the attached drawings in which.

DETAILED DESCRIPTION

Figure 1:
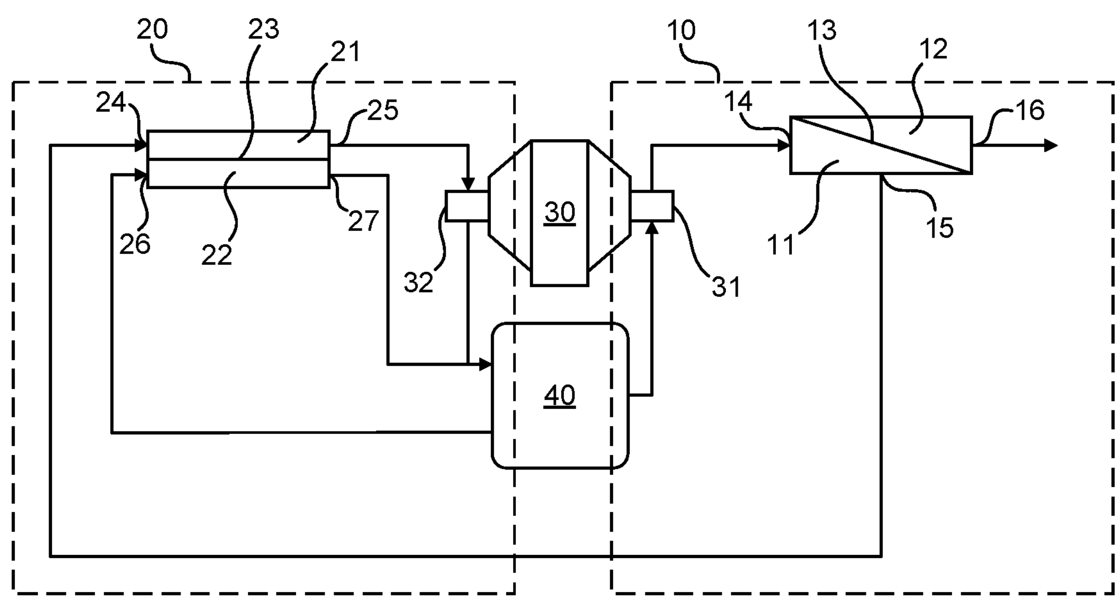
FIG. 1 illustrates a system for RO and PRO according to a first embodiment.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, may be embodied in various different forms, and should not be construed as being limited to only the illustrated embodiments herein. These embodiments are provided as examples so that this disclosure will be complete and will fully convey the aspects and features of the present invention to those skilled in the art.

Accordingly, elements not considered necessary to those having skill in the art for a complete understanding of the features of the present invention may not be described.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. As used herein, the term "substantially", "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

FIG. 1 schematically illustrates a system for reverse osmosis, RO, and for pressure retarded osmosis, PRO, according to a first embodiment. The system comprises a RO subsystem 10 and a PRO subsystem 20 that are indicated with dashed boxes in FIG. 1.

The RO subsystem 10 comprises a high-pressure RO chamber 11 and a low-pressure RO chamber 12 that are separated by a RO membrane 13 and, together, form a RO tank. The high-pressure RO chamber 11 has a RO feed inlet 14 and a brine outlet 15, while the low-pressure RO chamber 12 has a permeate outlet. Preferably, each of the inlets and outlets is valve controlled, wherein active valves or passive valves (e.g., check valves) may be used.

The PRO subsystem 20 comprises a high-pressure PRO chamber 21 and a low-pressure PRO chamber 22 that are separated by a PRO membrane 23 and, together, form a PRO tank. The high-pressure PRO chamber 21 has a draw inlet 24 and a draw outlet 25 and the low-pressure PRO chamber 22 has a PRO feed inlet 26 and a PRO feed outlet 27. Each of the inlets and outlets may be valve controlled with active valves and/or passive valves.

The system further comprises a feed solution reservoir 40 comprising a feed solution. The feed solution reservoir 40 may be e.g., a basin, a stream or the sea. The feed solution reservoir 40 is connected to the RO subsystem 10 and the PRO subsystem 20 via piping, particularly by fluid-tight piping. In FIGS. 1 to 8, such piping is represented by arrows. The feed solution reservoir 40 may be considered part of the RO subsystem 10 and/or the PRO subsystem 20 or may be considered separate to these subsystems, which is not relevant.

The system of the present disclosure further comprises an induction motor 30, particularly an asynchronous motor, that has a stator and a rotor. The system further comprises an axial piston pump 31 as a hydraulic pump that is configured for providing a feed solution from the feed solution reservoir 40 to the RO feed inlet 14. The system further comprises an axial piston motor 32 as a hydraulic motor that is configured for receiving a draw solution from the draw outlet 25 and providing it to the feed solution reservoir 40. The rotor of the induction motor 30 is mechanically connected to an input shaft of the axial piston pump 31 and to an output shaft of the axial piston motor 32. Particularly, the rotor of the induction motor 30 is connected to a motor shaft of the induction motor 30, wherein this motor shaft is connected to said input shaft and to said output shaft and wherein this motor shaft may be either a single continuous motor shaft or may be formed by pair of dual (double) motor shafts.

The feed solution reservoir 40 is fluidly connected to the feed inlet 14 of the high-pressure RO chamber 11 via the axial piston pump 31 that propels liquid transport from the feed solution reservoir 40 to the high-pressure RO chamber 11 with a certain volumetric flow and pressure. The solvent of the feed solution passes the RO membrane 13 into the low-pressure RO chamber 12, leaving an up-concentrated feed solution (brine) in the high-pressure RO chamber 11. The solvent is withdrawn from the low-pressure RO chamber 12 as permeate via the permeate outlet 16 at a low pressure. The permeate may be freshwater. The brine is withdrawn from high-pressure RO chamber 11 at high pressure via brine outlet 15.

The brine withdrawn from the high-pressure RO chamber 11 is provided to the draw solution inlet 24 of the high-pressure PRO chamber 21 via piping connecting the brine outlet 15 with the PRO draw solution inlet 24. At the same time, feed solution from the feed solution reservoir 40 is provided to the PRO feed solution inlet 26 via suitable piping. The solvent of the feed solution is driven by osmotic pressure through the PRO membrane 23 into the high-pressure PRO chamber 21 diluting the draw solution received via the draw solution inlet 24.

The diluted draw solution is withdrawn from high-pressure PRO chamber 21 via draw solution outlet 25 with a volumetric flow exceeding that at the PRO draw solution inlet 24. The withdrawn diluted draw solution is supplied to a motor inlet of axial piston motor 32, where its hydraulic energy is converted into rotation and, via induction motor 30, electricity. Depressurized diluted draw solution leaving the axial piston motor 32 via a motor outlet is guided back into the draw solution reservoir 40. The feed solution remaining in the low-pressure PRO chamber 22 is withdrawn therefrom and provided to the draw solution reservoir via the PRO feed outlet 27.

Figure 2:
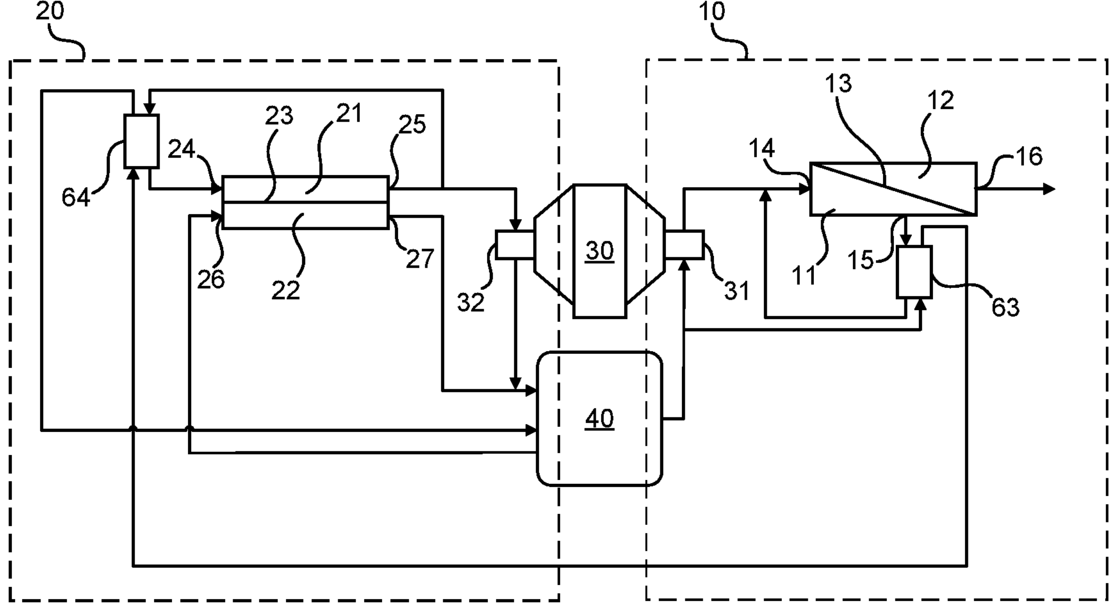
FIG. 2 illustrates a system for RO and PRO according to a second embodiment.

FIG. 2 schematically illustrates a system for RO and PRO according to a second embodiment. Same components are denoted with same reference signs as in the first embodiment and a repeated description of these components is omitted for sake of brevity.

The system of FIG. 2 differs from the system of FIG. 1 in that energy recovery devices 63, 64 are disposed in the RO subsystem 10 as well as in the PRO subsystem 20. Particularly, in the RO subsystem 10 an RO energy recovery device, ERD, 63 is interconnected between the brine outlet 15 and the RO feed inlet 14. In more detail, the RO ERD 63 receives feed solution from the feed solution reservoir 40 at a low pressure and receives brine from the high-pressure RO chamber 11 at a high pressure. In the RO ERD 63 hydraulic energy is transferred from the high-pressure brine to the low-pressure feed solution and, consequently, the feed solution is provided by the RO ERD 63 with an increased pressure to the RO feed inlet 14 and the brine is provided by the RO ERD 63 with a decreased pressure to the feed reservoir 40.

In the PRO subsystem 20, a PRO energy recovery device, ERD, 64 is interconnected between the draw outlet 25 and the draw inlet 24 of the high-pressure PRO chamber 21. In more detail, a piping connected to the draw outlet 25 is split providing one flow path to a motor inlet of the axial piston motor 32 and another flow path to the PRO ERD 64. Via the another flow path, part of the diluted draw solution withdrawn from the high-pressure PRO chamber 21 is provided to the PRO ERD 64, while another part of said solution is provided to the axial piston motor 32. Hence, the PRO ERD 64 receives diluted PRO draw solution at a high pressure. The PRO ERD 64 further receives brine withdrawn from the brine outlet 15 of the high-pressure RO chamber 11 at a low pressure. In the PRO ERD 64 hydraulic energy is transferred from the high pressure diluted draw solution to the low-pressure brine and, consequently, the brine is provided as PRO draw solution to the draw inlet 24 with an increased pressure and the diluted draw solution is provided to the feed solution reservoir 40 with a decreased pressure.

Figure 3:
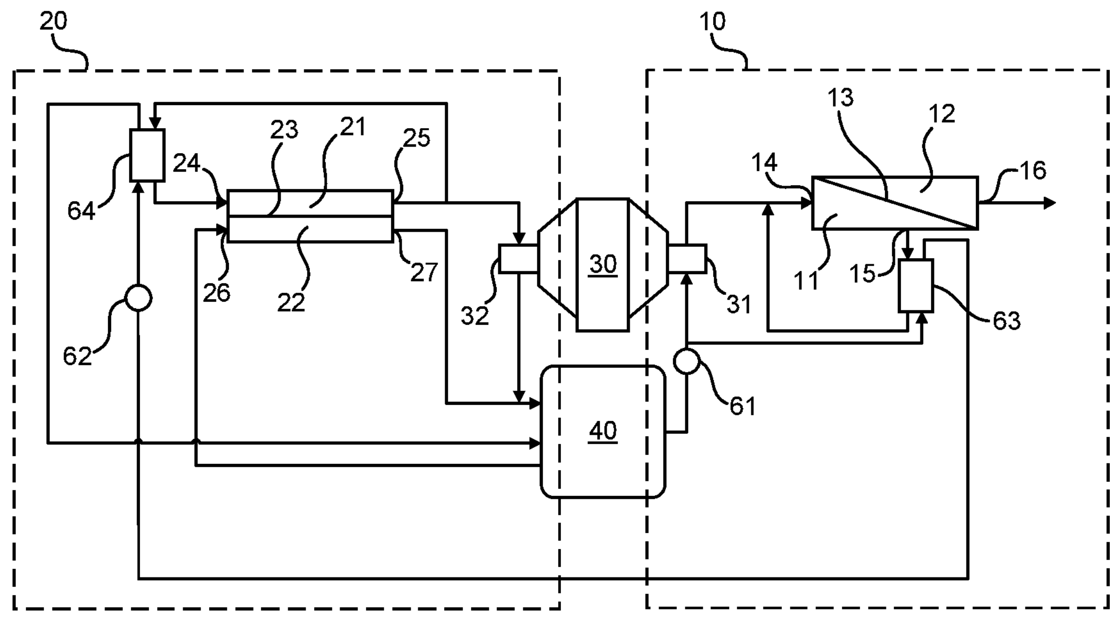
FIG. 3 illustrates a system for RO and PRO according to a third embodiment.

FIG. 3 schematically illustrates a system for RO and PRO according to a third embodiment. Therein, same components are denoted with same reference signs as in previous embodiments and a repeated description of these components is omitted for sake of brevity.

The system of FIG. 3 differs from the system of FIG. 2 in that feed pumps 61, 62 are disposed in the RO subsystem 10 and in the PRO subsystem 20. Particularly, a RO feed pump 61 is interconnected between the feed solution reservoir 40 and the axial piston pump 31. The RO feed pump 61 reduces the load on the axial piston pump 31. Further, a PRO feed pump 62 is interconnected between the feed reservoir 40 and the PRO ERD 64 and further increases the pressure of the PRO draw solution upstream the draw inlet 24.

Figure 4:
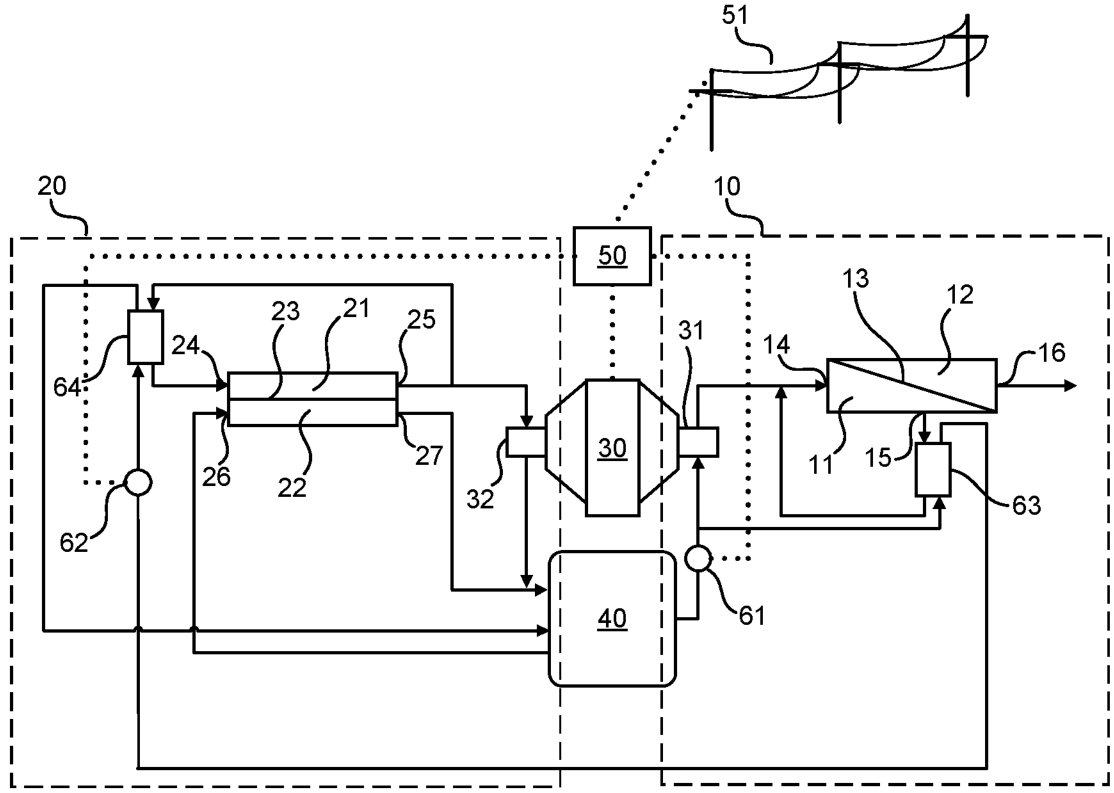
FIG. 4 illustrates a system for RO and PRO according to a fourth embodiment.

FIG. 4 schematically illustrates a system for RO and PRO according to a fourth embodiment. Therein, same components are denoted with same reference signs as previous embodiments and a repeated description of these components is omitted for sake of brevity.

The system of FIG. 4 differs from the system of FIG. 3 in that an energy storage device 50 is connected to the induction motor 30 and to an electric power grid 51. Electric connections are illustrated by dotted lines in FIGS. 4 to 6. The energy storage device 50 is preferably a battery such as a lithium ion battery that is configured to receive as well provide electrical energy to as well from the induction motor 30. The energy storage device 50 is preferably configured to receive as well provide electrical energy to as well from the power grid 51. When the energy storage device 50 provides electrical power to the induction motor 30, the induction motor 30 can operate with a positive slip and when the energy storage receives electrical power from the induction motor 30, the induction motor 30 can operate with a negative slip. However, the conversion between electric power provision and consumption can also be unrelated to slip of the induction motor 30, for example if a doubly-fed electric machine is used as the induction motor 30 and inverter control is utilized. The energy storage device 50 may comprise one or more frequency converters, e.g., for connecting to the power grid 51 and/or the induction motor 50. As also shown in FIG. 4, the energy storage device 50 powers the RO feed pumps 61 and the PRO feed pump 62.

Figure 5:
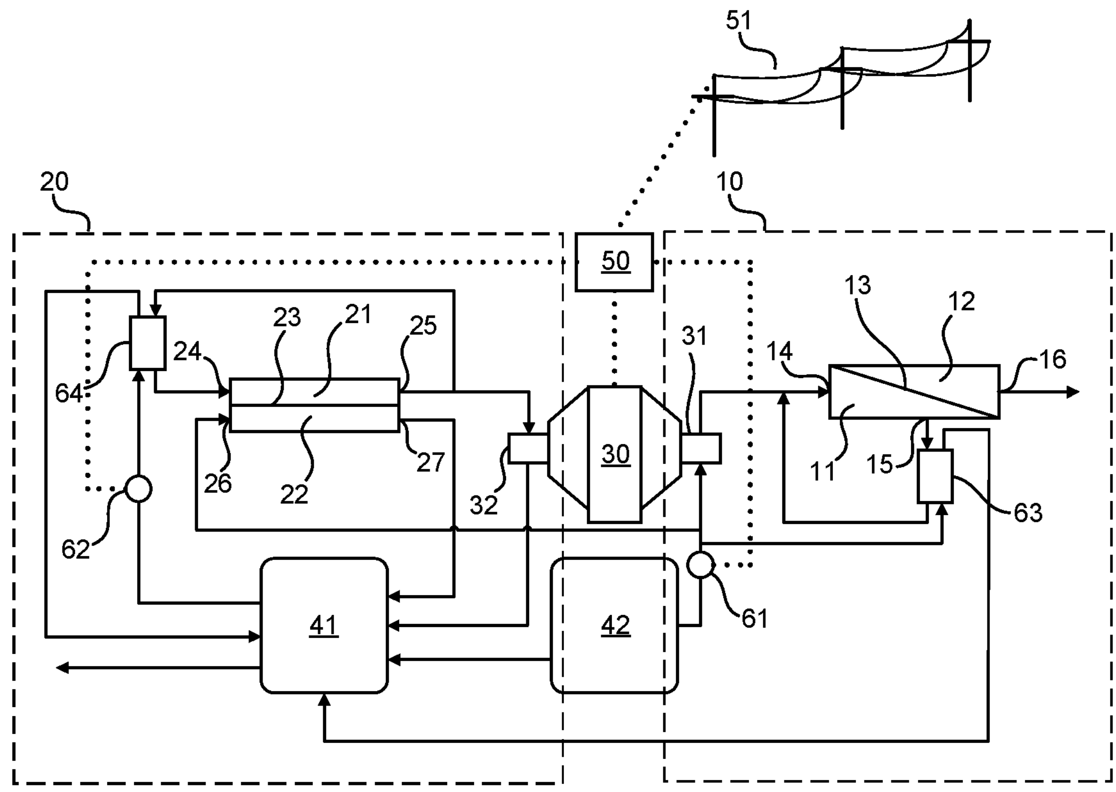
FIG. 5 illustrates a system for RO and PRO according to a fifth embodiment.

FIG. 5 schematically illustrates a system for RO and PRO according to a fifth embodiment. Therein, same components are denoted with same reference signs as previous embodiments and a repeated description of these components is omitted for sake of brevity.

The system of FIG. 5 differs from the systems of the previous FIGS. 1 to 4 in that it comprises a draw solution reservoir 41 next to a seawater reservoir 42 as a feed solution reservoir. The seawater reservoir 42 provides the feed solution to the RO subsystem 10, particularly to the RO feed inlet 14 via the hydraulic motor 31. However, the seawater reservoir 42 does not receive the brine solution, reducing the system's ecological impact. Further, the system of FIG. 5 is configured to be "off the grid", while producing clean (fresh) water and (electrical) energy at the same time.

The draw solution reservoir 41 receives brine solution from the brine outlet 15 (via RO ERD 63), receives the diluted draw solution from the draw outlet 25 via the axial piston motor 32 and via the PRO ERD 64, receives RO feed solution from the seawater reservoir 42 and from the PRO feed outlet 27, and provides the draw solution to the draw inlet 24 (via the PRO ERD 64). The draw solution reservoir 41 further provides an up-concentrated brine/draw solution, to another process stage, e.g., an evaporator (not shown).

In a particular example, the seawater reservoir 42 provides 186 $m^3$/h of feed solution at a pressure of 2 bar via the RO feed pump 61. A part of said volumetric feed solution flow, particularly 53 $m^3$/h, is provided the RO ERD 63, while the remaining part of said volumetric feed solution flow, i.e., 133 $m^3$/h, is provided to the axial piston pump 31 and from there, with a pressure of 66 bar, to the RO feed inlet 14. The solvent of the feed solution passes the RO membrane 13 and leaves the low-pressure RO chamber 12 via the permeate outlet 16 with a pressure of 2 bar and with a volumetric flow of 133 $m^3$/h. The up-concentrated feed solution is withdrawn from the high-pressure RO chamber 11 as brine via the brine outlet 15 with a volumetric flow of 53 $m^3$/h and at a pressure of 62 bar. In the RO ERD 63 hydraulic energy is transferred from the brine to the part of the feed solution received from the seawater reservoir 42 such that the part of the feed solution is also provided from the RO ERD 63 to the feed inlet 14 at a pressure of 66 bar and with a volumetric flow of 53 $m^3$/h.

The brine is provided from the RO ERD 63 with a volumetric flow of 53 $m^3$/h and at a pressure of 2 bar to the draw solution reservoir 41. From the draw solution reservoir 41 the brine is provided as draw solution via the PRO feed pump 62 with a volumetric flow of 100 $m^3$/h and at a pressure of 2 bar to the PRO ERD 64. The PRO ERD 64 feeds the draw inlet 24 of the high-pressure PRO chamber 21 while the feed inlet 26 of the low-pressure PRO chamber 22 is fed with a part of the volumetric flow driven by the RO feed pump, particularly 100 $m^3$/h of feed solution at a pressure of 2 bar. In the PRO unit, the solvent of the feed solution passes the PRO membrane 23 and dilutes the draw solution that leaves the high-pressure PRO chamber with an increased pressure of 200 bar and a volumetric flow of 150 $m^3/h$ via the draw outlet 25. A part of said volumetric flow of diluted draw solution, particularly 50 $m^3/h$ is provided to a motor inlet of the axial piston motor at a pressure of 200 bar. After conversion of hydraulic energy to electrical energy via the axial piston motor 32 and the induction motor 30, said part of the volumetric flow of 50 $m^3/h$ is provided back to the draw solution reservoir 41 with a pressure of 2 bar. Another part of the volumetric flow of diluted draw solution, particularly 100 $m^3/h$ is provided with a pressure of 200 bar to the PRO ERD 64. There hydraulic energy is transferred from the part of the diluted draw solution to the draw solution provided by the PRO feed pump 62 such that the draw solution is provided to the draw inlet 24 with increased pressure, while the depressurized diluted draw solution is provided to the draw solution reservoir at a pressure of 2 bar. In the above example, all membranes are considered as ideal entities with no pressure loss across them and the ERD's are idealized with no pressure drop or other internal losses. The feed and booster pumps are modelled with 80% energy efficiency and the axial piston pump 31, and motors 32 are modelled with 93% energy efficiency.

In the embodiment of FIG. 5, the draw solution reservoir 41 again further provides an up-concentrated brine/draw solution, to another process stage, e.g., an evaporator (not shown) and may further receive additional feed solution from the seawater reservoir 42 for up-concentration. A similar embodiment is shown in FIG. 6 that schematically illustrates a system for RO and PRO according to a sixth embodiment, wherein same components are denoted with same reference signs as in previous embodiments and wherein a repeated description of these components is omitted for the sake of brevity.

Figure 6:
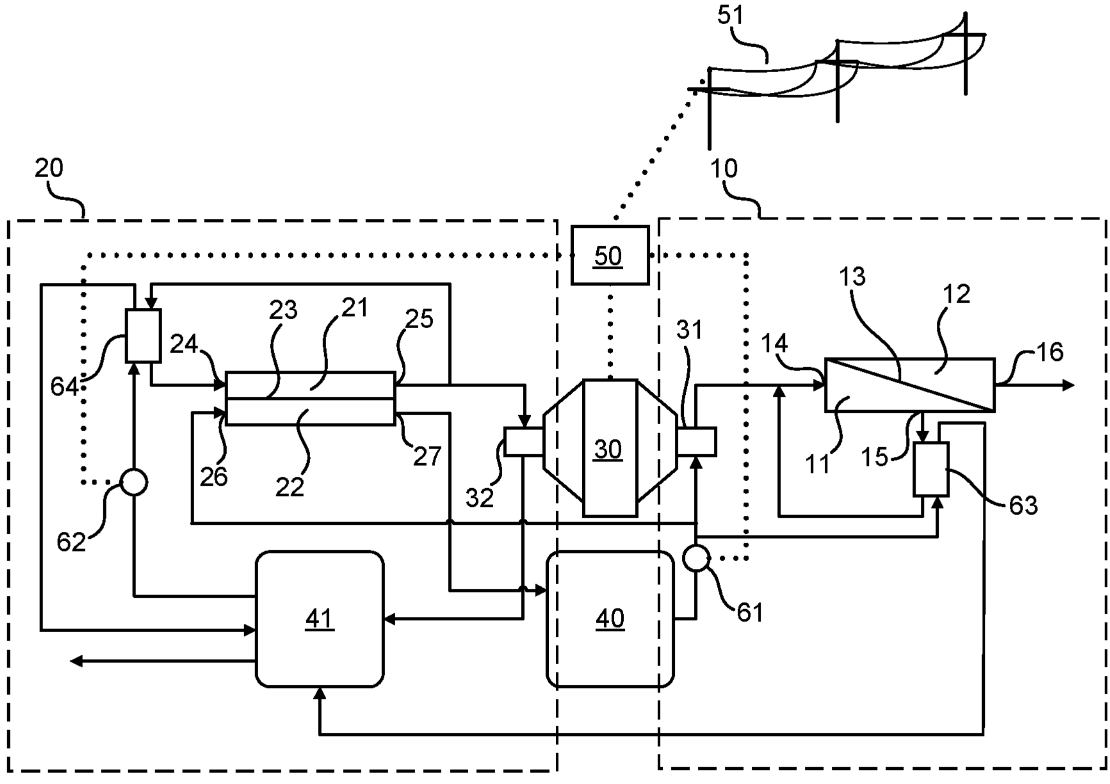
FIG. 6 illustrates a system for RO and PRO according to a sixth embodiment.

FIG. 6 differs from FIG. 5 in that the feed solution from the PRO feed outlet 27 is provided to the feed solution reservoir 40 instead of the draw solution reservoir 41. Further, in FIG. 6 the draw solution reservoir 41 does not receive additional feed solution from the feed solution reservoir 40 for up-concentration. Also, in this configuration, an ecological impact of the system is minimized and the net inflow into the draw solution reservoir 41 is only determined by the volumetric flow at the brine outlet 15 and by the volumetric flow across the PRO membrane 23, wherein the latter corresponds to the difference of the volumetric flow rate at the PRO draw outlet 25 and the volumetric flow rate at the PRO draw inlet 24. Hence, the concentration in the draw solution reservoir 41 is always at least the brine concentration if solvent is evaporated from the draw solution reservoir 41 (indicated by the lowermost arrow from the draw solution reservoir 41 on the left side) with an evaporation rate that exceeds the difference of the volumetric flow rates at the PRO draw outlet 25 and the PRO draw inlet 24, i.e., which exceeds the volumetric flow across the PRO membrane 23. Thus, the generation/harvesting of minerals, e.g., salt, can be controlled in the system of FIG. 6 by adjusting solely the evaporation rate and/or the flow through PRO membrane 23.

Figure 7:
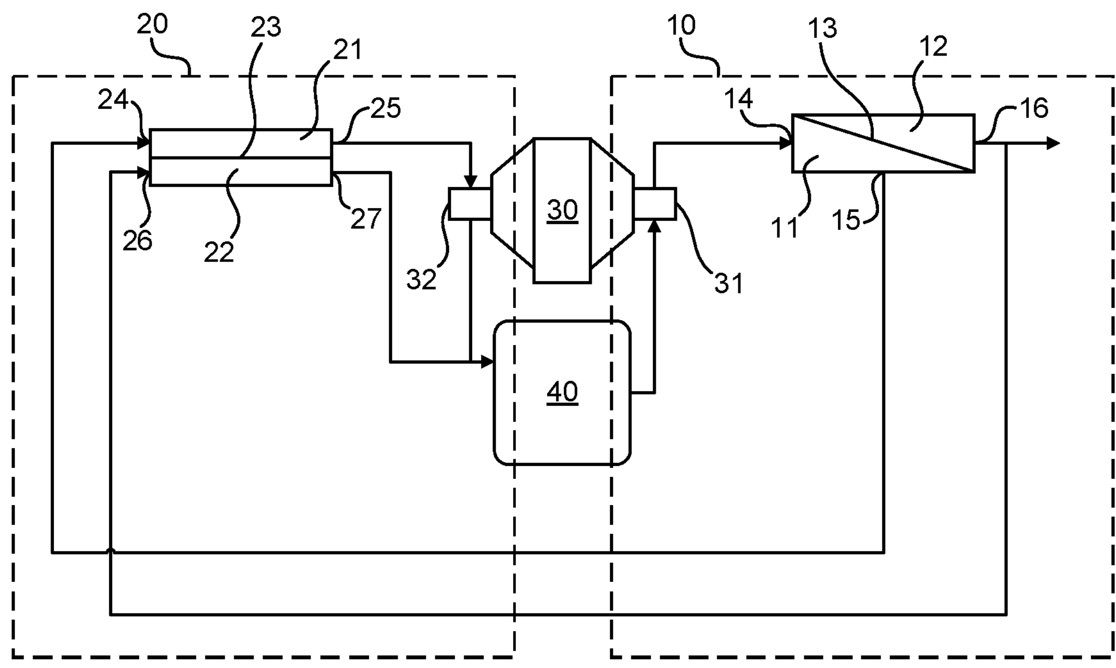
FIG. 7 illustrates a system for RO and PRO according to a seventh embodiment.

FIG. 7 schematically illustrates a system for RO and PRO according to a seventh embodiment. Therein, same components are denoted with same reference signs as previous embodiments and a repeated description of these components is omitted for sake of brevity.

The system of FIG. 7 differs from the systems of the previous FIGS. 1 to 6 in that the feed solution for the PRO subsystem 20 is not provided from the feed solution reservoir 40 but instead the permeate of the RO process is provided as feed solution to the PRO process. Therefore, the system of FIG. 7 comprises a piping between the permeate outlet 16 and the PRO feed inlet 26. Other components of the previous systems, such as ERDs, feed pumps, an electric storage device or a power grid, are omitted in FIG. 7. However, also this embodiment may comprise these components in a similar manner as previously described.

Figure 8:
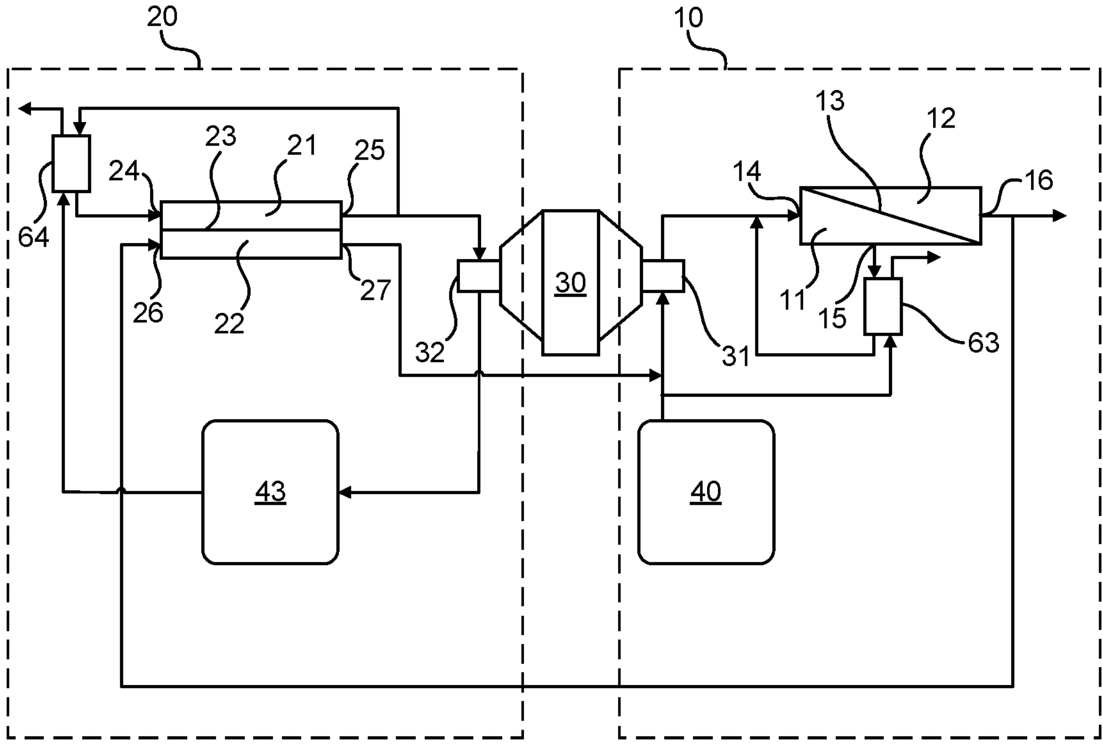
FIG. 8 illustrates a system for RO and PRO according to an eighth embodiment.

FIG. 8 schematically illustrates a system for RO and PRO according to an eighth embodiment. Therein, same components are denoted with same reference signs as previous embodiments and a repeated description of these components is omitted for sake of brevity.

The system of FIG. 8 differs from the systems of the previous FIGS. 1 to 7 in that the brine of the RO process is not used as the draw solution for the PRO process. Instead, while the permeate of the RO process is used as the feed solution for the PRO process, the draw solution of the PRO process is obtained by utilizing a mineral reservoir 43, such as e.g., an underground salt resource, particularly by pumping solvent, e.g., water, through such mineral reservoir 43 in order to get a high solute concentration. Such a setup is advantageously used when a mineral content of the feed solution is not interesting for harvesting and/or when an existing mineral reservoir 43 provides an opportunity for obtaining a high concentration gradient for driving the PRO process. The system of FIG. 8 further comprises a RO ERD 63 that is interconnected between the brine outlet 15 and the feed inlet 14 of the high-pressure RO chamber 11 and a PRO ERD 64 that is interconnected between the draw outlet 25 and the draw inlet 24 of the PRO high-pressure chamber 21 as described already with respect to previous embodiments. Further components of the previous systems, such as feed pumps, an electric storage device or a power grid, are omitted in FIG. 8. However, also this embodiment may comprise these components in a similar manner as described.

Figure 9:
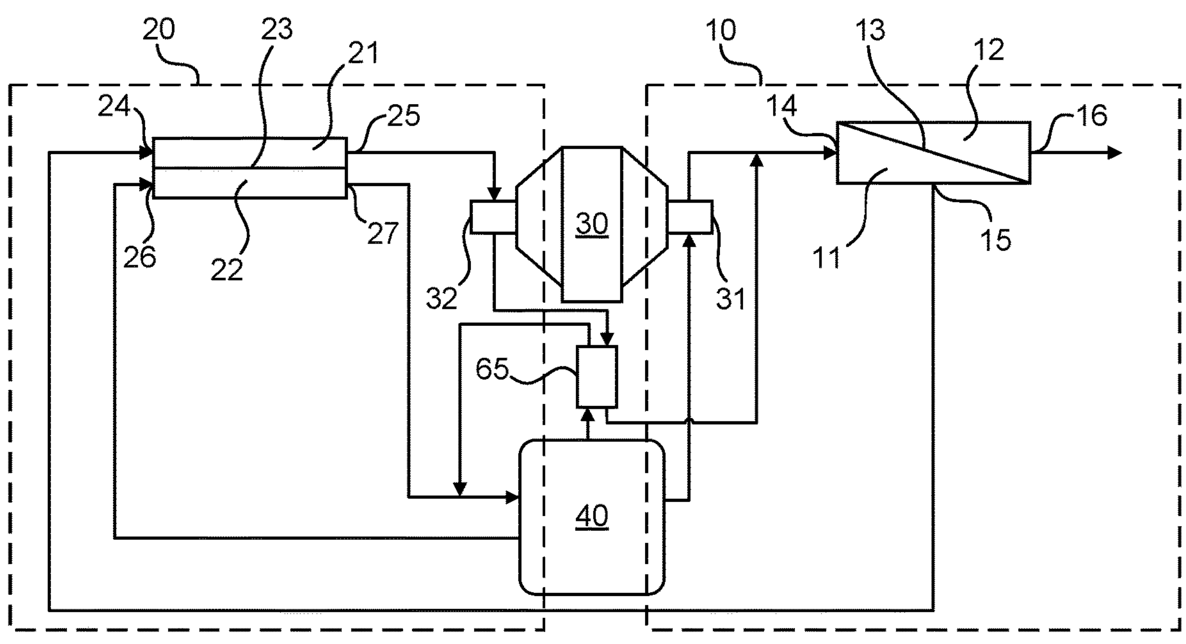
FIG. 9 illustrates a system for RO and PRO according to an eighth embodiment.

FIG. 9 schematically illustrates a system for RO and PRO according to a ninth embodiment. Therein, same components are denoted with same reference signs as previous embodiments and a repeated description of these components is omitted for sake of brevity.

The system of FIG. 9 differs from the systems of the previous FIGS. 1 to 8 in that an energy recovery device, particularly an isobaric pressure exchanger 65 is interconnected between the PRO subsystem 20 and the RO subsystem 10. In comparison to the specific embodiment as explained with reference to FIG. 5, with the isobaric pressure exchanger 65 only a part of the hydraulic energy of the PRO subsystem 20 is transferred to the RO subsystem 10 via the indirect mechanical connection of the induction motor 30, while another part of said hydraulic energy is transferred via the isobaric pressure exchanger 65 from the PRO to the RO side.

Particularly, in the embodiment of FIG. 9 a delta pressure of the hydraulic motor 32 is adjusted such that hydraulic energy of a flow with 50 $m^3/h$ and 200 bar at the motor inlet is converted to mechanical energy such that a flow with 50 $m^3/h$ and 65 bar exits the hydraulic motor at the motor outlet and is input to the isobaric pressure exchanger 65. There, the remaining hydraulic energy of said flow is transferred to a low-pressure inflow from the feed solution reservoir 40, entering the isobaric pressure exchanger 65 with a pressure of 2 bar and exiting with a pressure of about 65 bar. In the RO subsystem, the hydraulic pump 31 thus pressurizes only a part of the inflow to the high-pressure RO chamber 11 up to 65 bar, while the outflow of the isobaric pressure exchanger 65 provides the remaining inflow thereto. By adjusting the delta pressure of the hydraulic motor in such way a transfer efficiency of the isobaric pressure exchanger 65 is advantageously improved. Further advantageously, the delta pressure of the hydraulic motor 32 follows the pressure at a high-pressure inlet of the isobaric pressure exchanger 65 which again follows the pressure at the RO feed inlet 14 and thus a self-adjusting system can be provided.

Figure 10:
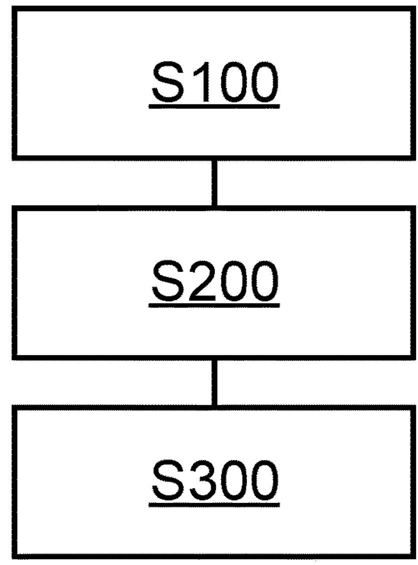
FIG. 10 illustrates a method for RO and PRO according to an embodiment.

FIG. 10 schematically illustrates a block diagram of a method for operating a system for reverse osmosis, RO, and for pressure retarded osmosis, PRO, as previously described with respect to FIGS. 1 to 9 according to an embodiment. Therein, the method comprises the step S100 of providing a feed solution to the RO feed inlet 14 at a first pressure and a first volumetric flow rate via the hydraulic pump 31. The method further comprises the step S200 of receiving, by the hydraulic motor 32, a draw solution from the draw outlet 25 at a second pressure and a second volumetric flow rate. The method further comprises the step S300 of transferring energy from the hydraulic pump 31 configured for providing a feed solution to the RO feed inlet 14 to the hydraulic motor 32 configured for receiving a draw solution from the draw outlet 25. In a preferred embodiment of the system comprising an induction motor 30, step S300 may further comprise operating the induction motor 30 with a slip based on a ratio of the first pressure and first volumetric flow rate to the second pressure and second volumetric flow rate. The steps S100, S200, and S300 are not to be understood as referring to a sequence of steps but these steps are rather performed simultaneously in a steady operation of the system.

Figure 11:
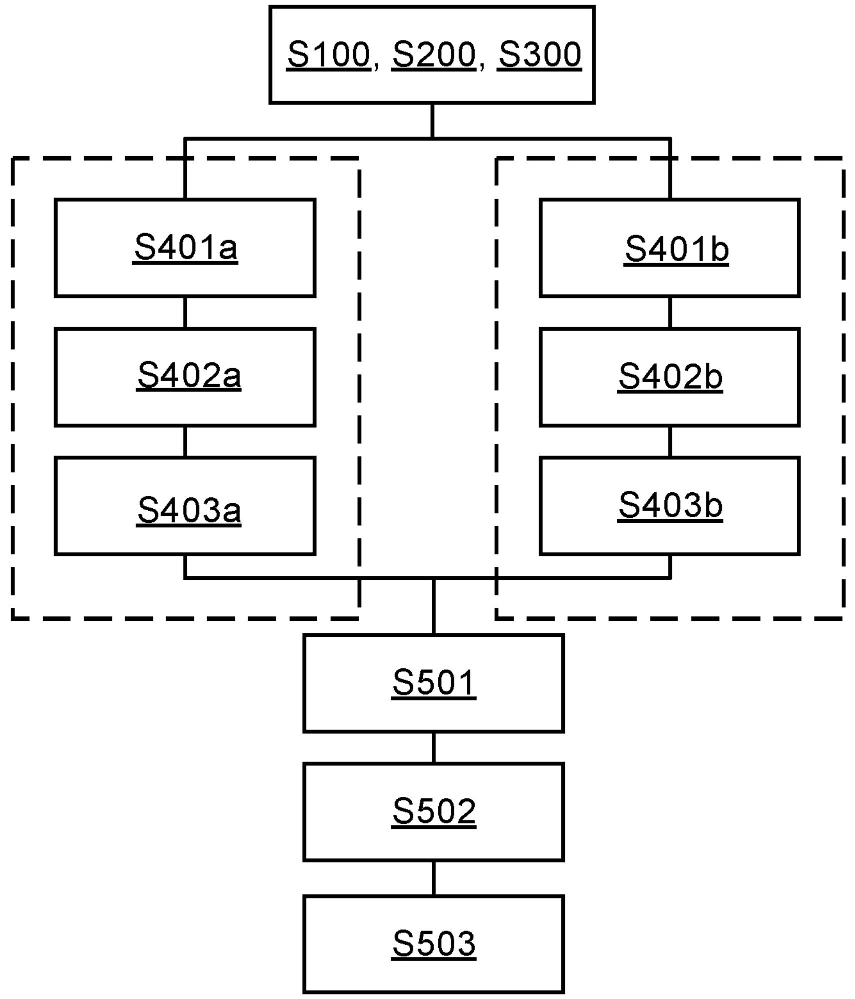
FIG. 11 illustrates a method for RO and PRO according to another embodiment.

FIG. 11 schematically illustrates a block diagram of a method for operating a system for reverse osmosis, RO, and for pressure retarded osmosis, PRO, as previously described with respect to FIGS. 1 to 9 according to another embodiment. In FIG. 11, the steps S100, S200, and S300 are performed, describing a steady operation of the system. Further steps of the method are performed in dependence of an operation mode. In a first operation mode, the induction motor 30 of FIGS. 1 to 8 is operated with positive slip in step S401*a* and therefore consumes electrical energy from the energy storage device 50 and/or the power grid 51 (e.g., of FIGS. 4 to 6) in step S402*a*. According to the illustrated embodiment, the first operation mode further correlates with that a displacement ratio of the hydraulic pump 31 and the hydraulic motor 32 is adjusted to be larger than 1 in step S403*a* and/or delta pressures of the hydraulic motor being smaller than delta pressures of the hydraulic pump. Differently, in the second operation mode, the induction motor 30 is operated with negative slip in step S401*b* and further supplies electrical energy to the energy storage device 50 and/or the power grid 51 (e.g., of FIGS. 4 to 6) in step S402*b*. According to the illustrated embodiment, the second operation mode further correlates with that the displacement ratio of the hydraulic pump 31 and the hydraulic motor 32 is adjusted to be smaller than 1 and/or delta pressures of the hydraulic motor being larger than delta pressures of the hydraulic pump. Again, these steps S401, S402, and S403 are not to be understood as referring to a sequence of steps but these steps can rather be performed simultaneously in a steady operation of the system.

The method of FIG. 11 further comprises steps that are again independent of the operation mode of the system being one of the first operation mode and the second operation mode. While the previously described steps rather serve the function of generating desalinated and/or purified water, these steps serve an additional purpose of harvesting minerals. In order to meet this purpose, in a step S501 a brine is collected from the brine outlet 15 and in the draw solution reservoir 41 (e.g., of FIGS. 5 and 6). In a step S502, draw solution is provided from the draw solution reservoir 41 to the draw inlet 24, while diluted draw solution from the draw outlet 25 is received in the draw solution reservoir 41. In a step S503 solvent from the draw solution reservoir 41 is evaporated with an evaporation rate of the solvent that is at least as high as a difference between the volumetric flow rate at the PRO draw outlet 25 and the volumetric flow rate at the PRO draw inlet 24, i.e., which exceeds the net flow of solvent through the PRO membrane 23. Again, these steps S501, S502, and S503 are not to be understood as necessarily referring to a sequence of steps but these steps can rather be performed simultaneously in a steady operation of the system.

What is claimed is:

1. A system for reverse osmosis, RO, and for pressure retarded osmosis, PRO, comprising:

a RO subsystem with a high-pressure RO chamber and a low-pressure RO chamber separated by a RO membrane, the high-pressure RO chamber having a RO feed inlet and a brine outlet and the low-pressure RO chamber having a permeate outlet;

a PRO subsystem with a high-pressure PRO chamber and a low-pressure PRO chamber separated by a PRO membrane, the high-pressure PRO chamber having a draw inlet and a draw outlet and the low-pressure PRO chamber having PRO feed inlet and a PRO feed outlet;

wherein a hydraulic pump configured for providing a feed solution to the RO feed inlet is mechanically connected to a hydraulic motor configured for receiving a draw solution from the draw outlet.

2. The system according to claim 1, further comprising an induction motor having a stator and a rotor, wherein the rotor is mechanically connected to an input shaft of the hydraulic pump and to an output shaft of the hydraulic motor.

3. The system according to claim 1, further comprising a feed solution reservoir connected to the RO feed inlet via the hydraulic pump and/or comprising a draw solution reservoir connected to the brine outlet, the draw inlet, and the draw outlet.

4. The system according to claim 1, wherein the hydraulic pump is an axial piston pump and wherein the hydraulic motor is an axial piston motor.

5. The system according to claim 1, wherein at least one of the hydraulic pump and the hydraulic motor has an adjustable displacement.

6. The system according to claim 2, wherein the induction motor is connected to an energy storage device and/or a power grid.

7. The system according to claim 6, wherein a displacement of the hydraulic pump is lower than a displacement of the hydraulic motor and wherein the induction motor is configured to operate with a negative slip and to supply electric power to the energy storage device and/or to the power grid.

8. The system according to claim 1, further comprising at least one feed pump in the RO subsystem and/or in the PRO subsystem.

9. The system according to claim 1, further comprising a RO energy recovery device being interconnected between the brine outlet and the RO feed inlet and/or a PRO energy recovery device being interconnected between the draw outlet and the draw inlet.

10. A method for operating the system for reverse osmosis, RO, and for pressure retarded osmosis, PRO, according to claim 1, the method comprising the steps of:

providing a feed solution to the RO feed inlet at a first pressure and a first volumetric flow rate via the hydraulic pump;

receiving, by the hydraulic motor, a draw solution from the draw outlet at a second pressure and a second volumetric flow rate; and transferring energy from the hydraulic pump configured for providing a feed solution to the RO feed inlet to the hydraulic motor configured for receiving a draw solution from the draw outlet via a mechanical connection.

11. The method according to claim 10, wherein the system further comprises an induction motor having a stator and a rotor, wherein the rotor is mechanically connected to an input shaft of the hydraulic pump and to an output shaft of the hydraulic motor, the method further comprising the step:

operating the induction motor with a slip based on a ratio of the first pressure and first volumetric flow rate to the second pressure and second volumetric flow rate.

12. The method according to claim 11, wherein the induction motor is connected to an energy storage device of the system for RO and for PRO and/or a power grid and wherein the method further comprises the steps of:

operating, in a first operation mode, the induction motor with positive slip and consuming electrical energy from the energy storage device and/or the power grid; and/or operating, in a second operation mode, the induction motor with negative slip and supplying electrical energy to the energy storage device and/or the power grid.

13. The method according to claim 11, wherein the system for RO and for PRO further comprises at least one feed pump in the RO subsystem and/or in the PRO subsystem and wherein the method further comprises the step of: operating the at least one feed pump with electrical energy from the energy storage device.

14. The method according to claim 10, wherein the system for RO and for PRO further comprises a seawater reservoir connected to the RO feed inlet via the hydraulic pump and to the PRO feed inlet and a draw solution reservoir connected to the draw outlet via the hydraulic motor, to the draw inlet, and to the brine outlet and wherein the method further comprises the steps of:

collecting brine from the brine outlet in the draw solution reservoir;

providing, from the draw solution reservoir, draw solution to the draw inlet and receiving, in the draw solution reservoir, diluted draw solution from the draw outlet; and evaporating solvent from the draw solution reservoir, wherein an evaporation rate of the solvent exceeds a difference of a volumetric flow rate at the draw outlet and a volumetric flow rate at the draw inlet.

15. A use of the system for reverse osmosis, RO, and for pressure retarded osmosis, PRO, according to claim 1 and comprising a seawater reservoir connected to the RO feed inlet via the hydraulic pump and to the PRO feed inlet and a draw solution reservoir connected to the brine outlet and to the draw outlet via the hydraulic motor for concentrating salt and/or other minerals in the draw solution reservoir, for extracting the salt and/or other minerals from the draw solution reservoir, and for providing freshwater from the permeate outlet.

16. The system according to claim 2, further comprising a feed solution reservoir connected to the RO feed inlet via the hydraulic pump and/or comprising a draw solution reservoir connected to the brine outlet, the draw inlet, and the draw outlet.

17. The system according to claim 2, wherein the hydraulic pump is an axial piston pump and wherein the hydraulic motor is an axial piston motor.

18. The system according to claim 3, wherein the hydraulic pump is an axial piston pump and wherein the hydraulic motor is an axial piston motor.

19. The system according to claim 7, further comprising at least one feed pump in the RO subsystem and/or in the PRO subsystem, wherein the at least one feed pump is connected to the energy storage device and/or the power grid in the system, and wherein the induction motor is connected to the energy storage device and/or the power grid.

* * * * *